Sept. 20, 1955 D. M. READ ET AL 2,718,028
MEAT TENDERIZING MACHINES
Filed June 8, 1951 5 Sheets-Sheet 2

Sept. 20, 1955 D. M. READ ET AL 2,718,028
MEAT TENDERIZING MACHINES
Filed June 8, 1951 5 Sheets-Sheet 3

Inventors
Douglas Melville Read
John Staples
By
Stevens, Davis, Miller & Mosher
their Attorneys

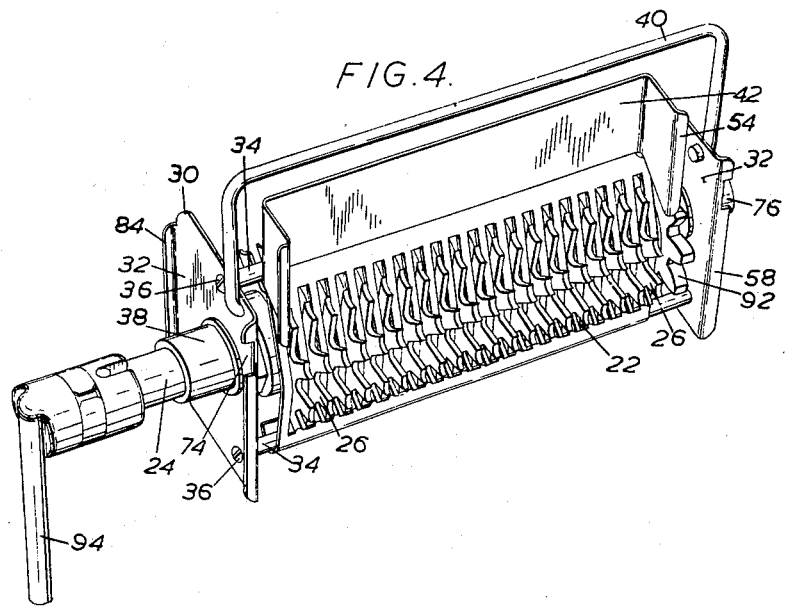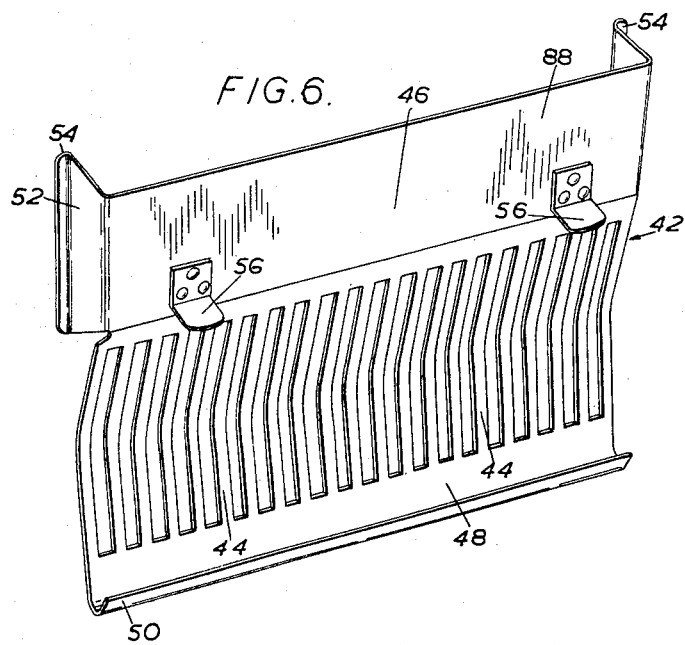

Sept. 20, 1955 D. M. READ ET AL 2,718,028
MEAT TENDERIZING MACHINES
Filed June 8, 1951 5 Sheets-Sheet 5
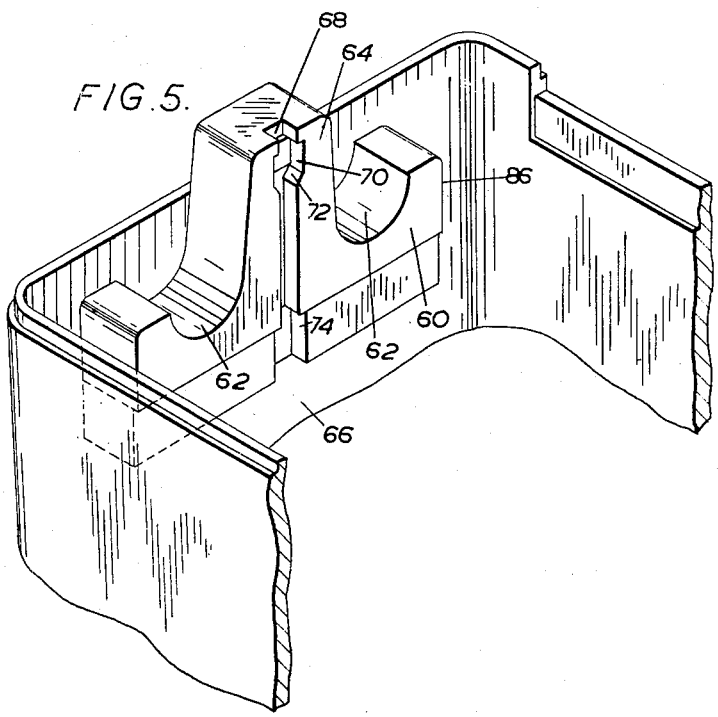

United States Patent Office 2,718,028
Patented Sept. 20, 1955

2,718,028
MEAT TENDERIZING MACHINES

Douglas Melville Read and John Staples, Slough, England, assignors to Lan-Elec Limited, Slough, England Application June 8, 1951, Serial No. 230,514

Claims priority, application Great Britain June 8, 1950

10 Claims. (Cl. 17—26)

This invention relates to meat tenderizing machines of the type in which the meat to be tenderized is passed between rotating knife rolls each comprising a number of spaced annular toothed discs or plates arranged fast on a rotatable horizontal shaft, the rolls being so mounted that the teeth on one roll overlap the teeth on the other roll and lie partially between the teeth of the other roll. Strippers in the form of bars or rods are arranged so that one lies in each of the spaces between the discs or plates.

In such machines there is a tendency for the teeth to tear the tissues of the meat apart with the result that torn tissues clog the rolls which are difficult to clean owing to the size of the spaces between the toothed discs and to the fact that the teeth are very sharp thus easily causing damage to the operator's hand.

The object of this invention is to provide tenderizing machines in which the meat tissues are not torn from the meat, the rolls and other parts do not become clogged and which may be easily cleaned, the whole being of simple but sturdy construction and thus simple to manufacture, operate and maintain in a clean condition.

According to the present invention a meat tenderizing machine of the above type has a number of knife roll assemblies each mounted in a frame which can be removed separately from the machine, the knife roll shafts being journalled in bearings attached to or integral with the frame which are adapted to be supported in the machine on brackets or the like on the machine housing, and means are provided for separately removing each knife roll assembly within its frame from the machine housing.

Substantially straight strippers in the form of parallel spaced bars secured at each end to cross members, are detachably mounted on the roll frames, so that the bars lie between the knife discs or plates. The top cross members of the strippers may be provided with members forming a feed chute for the machine. The machine housing is closed by a lid having an aperture therein which when the strippers and knife rolls are in place in the machine, lies immediately above the top of the chute. Alternatively the chute may be arranged on the inner side of the lid in register with the slot therein, in which case the strippers are not provided with chute forming members.

The lid is preferably adapted when closed to force locking plungers, bolts or the like to engage slots, cutaway portions or the like on the knife roll assemblies, or knife roll frames or strippers or some or all of these members, to secure them in place in the operative position.

To enable the invention to be more fully understood it will now be described with reference to the accompanying drawings in which:

Fig. 4 is a perspective view of one of the knife roll assemblies mounted in its frame;

Fig. 5 is a perspective view of a portion of one end of the machine housing showing the bearing bracket; and Fig. 6 is a perspective view of one of the strippers.

Figure 1:
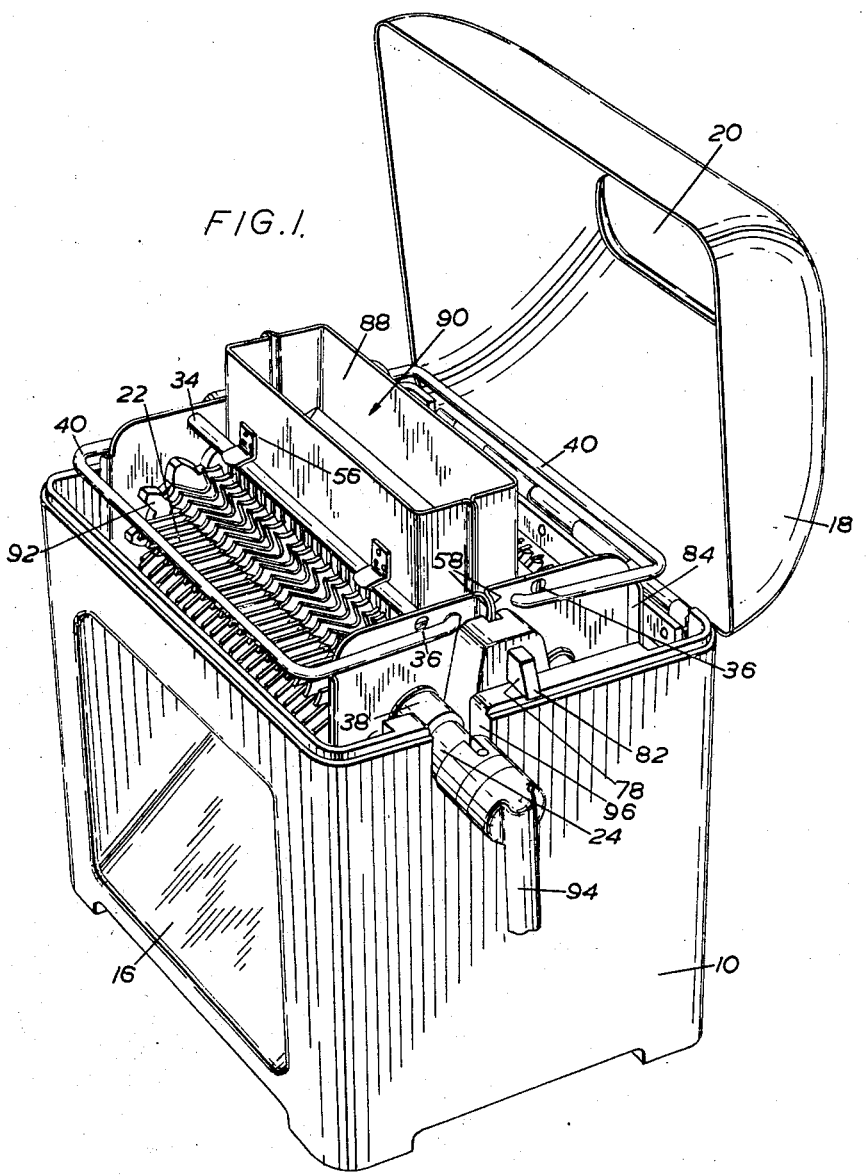
Fig. 1 is a perspective view of a machine constructed according to the invention, showing the lid in the open position.

Referring to the drawings, the meat tenderizing mechanism is mounted in a housing 10 having spaced end walls and an open top and adapted to be secured to a bench or other structure. At the bottom corners of the housing 10, plates or lugs 12 are formed integral with or secured to the housing, these plates or lugs having borings 14 therein through which fixing screws or the like may be passed. The plates or lugs may be formed on the outside of the housing if desired. The lower back portion of the housing 10 has a portion 13 cut away to lighten the machine.

The housing 10 is formed with a delivery chute 16 through which the meat is ejected after being tenderized.

The top of the housing 10 is closed by a hinged lid 18 in the top centre of which is an elongated aperture 20 through which the meat is fed to the tenderizing mechanism.

Figure 3:
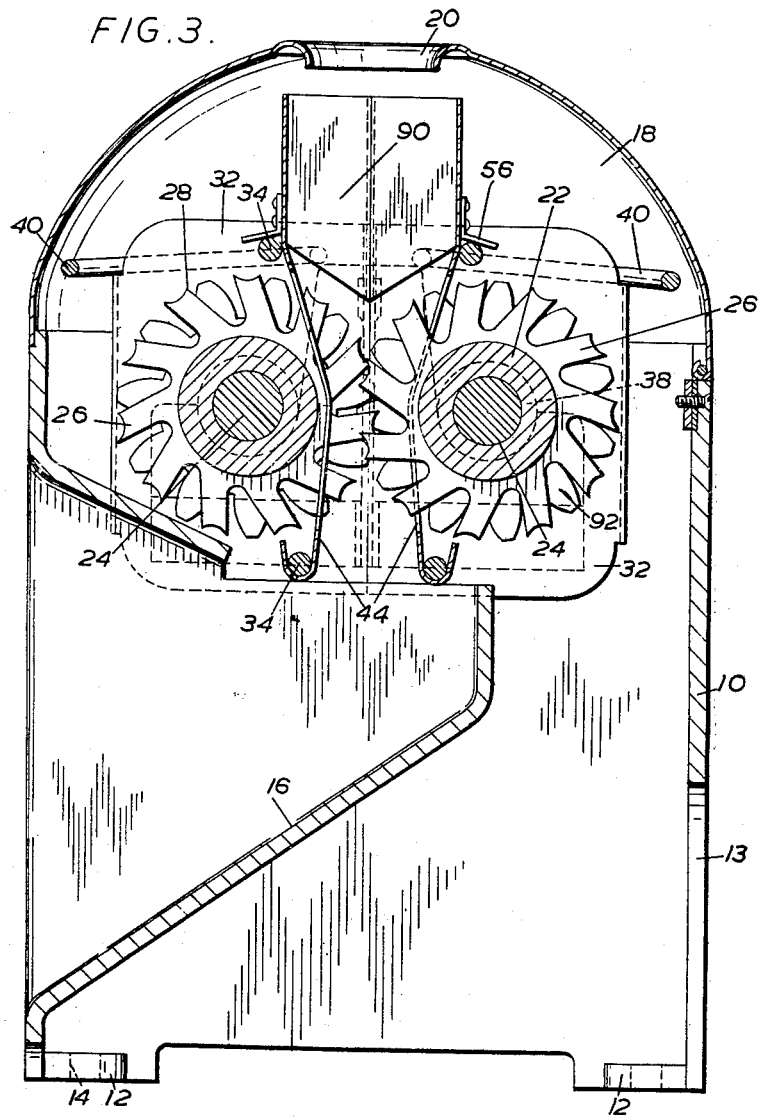
Fig. 3 is a vertical cross-section of the machine taken on the line III—III of Fig. 2 in the direction of the arrows, and showing the lid shut.

The tenderizing mechanism consists of two knife roll assemblies 22, each consisting of a shaft 24 on which are secured a number of toothed knives 26 arranged so that looking axially along the rolls the teeth are in alignment. The teeth 26 are shaped away from the direction of rotation of the rolls when tenderizing, and are each provided with two sharp prongs or points 28 (Fig. 3).

Each roll (Fig. 4) is mounted in a separate frame 30 comprising two end plates 32 secured in correct relation to each other by rods 34 fixed to the plates by screws 36; alternatively the rods 34 may be secured to the plates 32 by riveting. A bearing 38 for the roll shaft 24 is formed integral with or is secured to the end plates 32 and the roll shafts are freely journalled in these bearings. Each frame has a handle 40 hinged to each end plate 32 and extending lengthwise of the frame 30. Each handle 40 is freely hinged in the frame so that it may normally rest horizontally along the top of the frame (see Fig. 1) but may be swung upwardly so that the assembly may be lifted and carried thereby (see Fig. 4).

Strippers 42 (Fig. 6) are provided one for each knife roll frame. Each stripper consists of a number of vertically arranged bars 44 connected at each end to cross members, one 46 at the top and another 48 at the bottom. The bottom cross member 48 is bent in the shape of a U as at 50; the upper cross member 46 is extended upwards and provided with side extensions 52 which are bent at right angles thereto in the opposite direction to the lower U-shaped portions 50 of the cross members. The outer ends 54 of the side extensions are bent outwardly parallel to the cross members 46, 48 to form flanges. Each stripper has two clips 56 secured to the upper cross member 46, or formed integral with the upper cross member as by cutting it out from the upper cross member and bending it down.

The frame ends 32 also have sidewardly extending flanges 58 which are substantially in alignment, longitudinally of the machine, with the lower ends of the flanges 54 on the stripper extensions.

The machine housing 10 is provided with two brackets 60, one at each end; each bracket 60 has two contiguous U-shaped recesses or bearing supports 62 in its upper face and between these recesses has an upstanding portion 64. The brackets are secured in any known manner to the housing 10 and to give them added support, they rest on two blocks 66 formed integral with the housing wall (Fig. 5).

Vertical slots 68 are formed at the centre of the inner face of each portion 64. These slots 68 are at the top substantially twice the width of the flanges 58 on the roll assembly frame ends 32.

Spaced below the tops of the portions 64 the slots 68 are widened as at 70 and then lower down taper at 72 to substantially the same width as at the top. Slots 74 are also provided in the blocks 66 in prolongation of the slots 68 (Fig. 5). The widened slot portions 70 are to accommodate the inner ends of the spring pressed plungers to be described.

Figure 2:
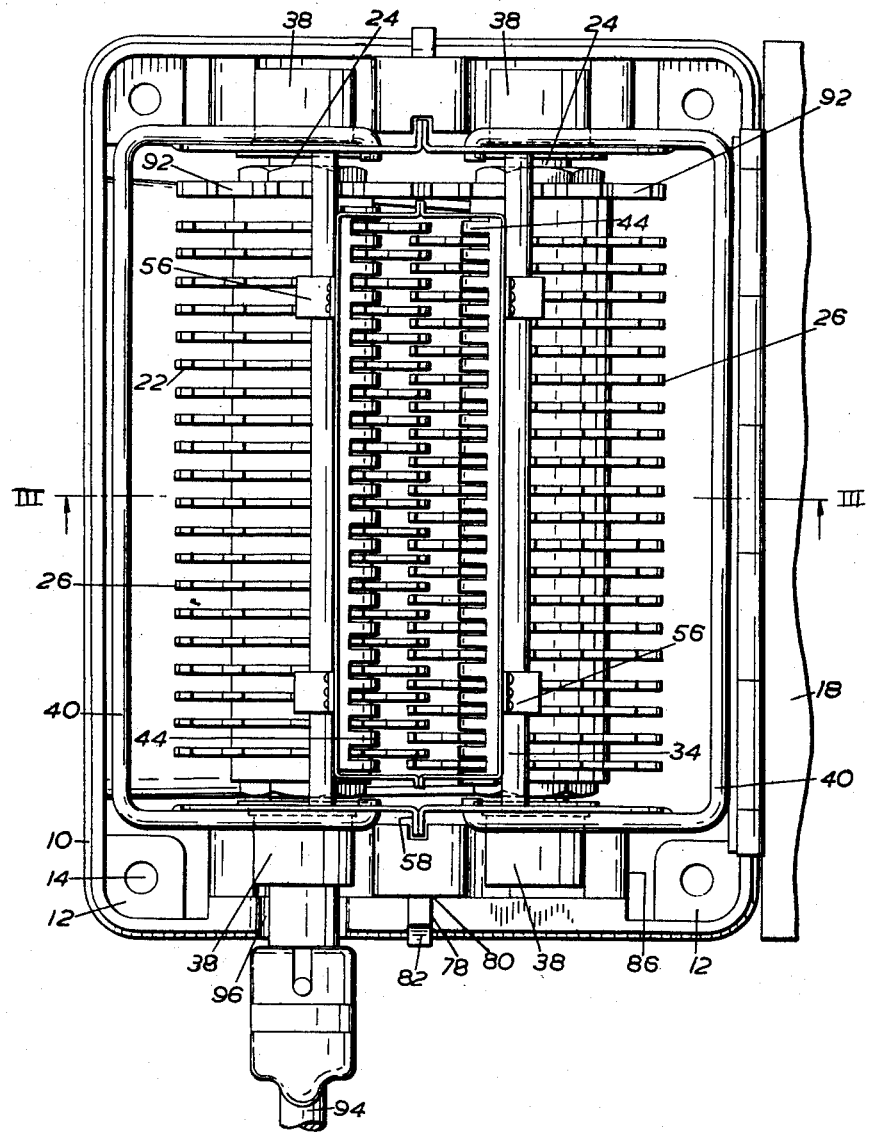
Fig. 2 is an enlarged plan view of the machine shown in Fig. 1 with part of the lid cut away.

The upper ends of the flanges 58 on the frame end plates 32 are provided with cut away portions 76. A spring biased plunger 78 is slidably arranged in a channel 80 formed in each portion 64. The plungers are thus mounted for sliding movement horizontally across the upper edges of the end walls and are normally extended over such edges, as shown in Fig. 2. The plungers, as shown in Fig. 1, have inclined outer free ends which engage the lower edges of the end walls of the lid 18, when the lid is moved downwardly. The plungers are forced inwardly by the lid and frictionally engage the inside surfaces of the lid end walls to hold the lid in a closed position. The other ends of the plungers are arranged so that when forced inwards by the shut lid 18, they project into the portions 70 of the slots 68 in the portions 64 on brackets 60.

To assemble the knife rolls in position, the strippers 42 are clipped to the frame; to do this the U-shaped lower edges 50 are engaged round the lower transverse rod 34 and the slips 56 are clipped over the upper transverse rod 34. The bars 44 are so spaced that they then lie between the knives 26 of the rolls 22 with their edges lying close to the knife disc side faces. Each assembly is then held by the handle 40 and lowered so that the flanges 58 slide into the slots 68 on the bracket portions 64 until the roll bearings 38 rest in the U-shaped recesses 62 in the brackets 60.

If desired the outer ends of the frame end plates 32 may be formed with flanges 84. It will be understood that the flanges 58 and 84 give added rigidity to the plates 32. The flanges 58 are arranged, when the frames are lowered into the brackets 60, to engage the outer ends 86 of the brackets and thus correctly position and hold the knife roll assemblies in correct relationship in the housing.

When the knife roll assemblies are in place and the lid 18 is lowered, the plungers 78 are forced inwards to engage the cut-away portions 76 on the flanges 58 of the end plates 32 and lock the assemblies in the operative position.

The upper cross members 46 of the strippers 42 have extensions 88 arranged to form between them when in position in housing an inlet chute 90 from beneath the lid slot, and their central portions i. e. the bars 44 form a channel through which the meat is fed between the overlapping knife teeth 26 and finally the lower cross members 48 of the strippers guide the meat into the discharge chute 16. The knife teeth bite into the meat and break down the tissues, thereby rendering it tender. The bars 44 of the strippers prevent the meat tissues being torn away and thus clogging the knives.

Each knife roll has a gear 92 at one end and the two gears intermesh. One roll shaft 24 has a handle 94 detachably secured thereto and extending through a slot 96 in the housing 10; by turning this handle the knife rolls are rotated.

The shape of the knives is not important; for example they are shown as tangential sloping away from the direction of knife rotation, but could be radial; the strippers may be substantially straight or as shown, having slightly bent bars 44. The chute 90 instead of being part of the strippers could be made separately and secured to the lid beneath the slot therein. The strippers would then not extend above the upper cross member 34 of the knife frame to which they are clipped.

The housing 10 and knife roll assemblies are preferably formed so that a clear space is left through the housing to enable a screwdriver or other tool to be inserted for securing the housing on the bench or other structure by screws through the plates or lugs 12.

Alternatively or in addition the housing may be provided with clamps of known construction by which the machine may be secured to the edge of a table or the like. In such a construction the clamps may be provided on a separate base plate or other member to which the housing may be removably attached. For example the base or the like may have runners or grooves co-operating with grooves or runners respectively on the housing so that the latter may be slid onto the base or the like. Means may be provided to lock the housing to the base or the like when in position.

In the construction where the feed chute 90 is provided on the lid 18, it may be formed separately and fixed to the lid in any known manner or it may be formed integral with the lid as by stamping out the elongated slot therein, or by spinning on.

The lid 18 may be hinged to the case in any known manner either at the side or at the back or front. Alternatively the lid may be formed separately and hooked on or otherwise attached to the housing in any known manner.

Locking means of any suitable kind in addition to the plungers 78 may be provided at the front of the housing to secure the lid in the closed position.

The chute 90 is preferably sufficiently deep to prevent the operator from catching his fingers between the knife rolls. Also the delivery chute 16 is preferably shaped or provided with guard members for the same purpose. The lower ends of the strippers 42 serve this purpose.

The knife roll frames are preferably in the form described above, but they may be made in any suitable manner, as in the form of an open sided box for example. The frame is preferably arranged so that it may be partially or wholly stripped to allow removal of the knife roll.

The strippers are preferably stamped from a single sheet of metal, but they may be formed in parts and secured together if desired. The bottom U-shaped portions 50 may be dispensed with and clips or other means provided for securing the strippers on the lower transverse frame member 34 or other part of the frame or knife roll assembly. If desired the strippers may be provided with hooks adapted to engage, and preferably clip over an upper part of the assembly, while the lower ends are straight and fitted into a slot or pass through a gap in the lower cross frame member 34. The lower clips 50 may be in the form of downwardly directed U-shaped spring members which may be pressed downwardly to engage the lower transverse frame member 34, while the upper clips 56, which may be of the same construction, engage the upper transverse frame member 34.

The bearing supporting brackets 60 in each end of the housing may be in one piece or separate brackets for each knife roll bearing may be employed. Any shape of recess 62 may be provided in these brackets, or projections may be provided in the housing above the brackets to co-operate therewith to form seats for the bearings and prevent lateral movement of the rolls.

The lid operated locking plungers 78 may be arranged to be operated independently of the lid or they may be replaced by members on the lid which when the lid is shut lie in contact with the mechanism to hold it in place.

In place of the flanges 58 on the knife frame end plates, slots may be arranged on the frames into which guides on the housing or the bracket portions 64 slide as the frames are lowered into the operative position.

A motor or other prime mover may be connected to one or both of the knife shafts. The handle 94 for rotating the shaft is preferably detachably connected to the the shaft but it may be integral therewith if desired. Suitable lubricators may be provided on the shafts or bearings if desired.

The knife rolls are preferably made of high grade stainless steel as may be the rest of the mechanism. All parts in contact with the food are preferably made of stainless steel. The housing may be made of any suitable material, preferably metal, and may be coated with any suitable material such as vitreous or stoved enamel. The housing is preferably streamlined throughout to avoid ledges, corners and the like on or in which dirt or meat tissues could collect.

We claim:

1. A meat tenderizing machine comprising a housing having opposing end walls and an open top, brackets carried by the inside of each of the end walls, each bracket having a vertical slot and bearing supports on opposite sides of the slot, a pair of knife assemblies removably mounted in side by side relation in the housing, each assembly including spaced apart end plates, means associated with said plates connecting said plates rigidly together, a shaft rotatably journalled in the plates of each assembly and having its ends extending beyond the plates, bearings on the ends of the shafts, said bearings being seated on the bearing supports, means on the plates disposed in the slots, a plurality of circular knives mounted on each shaft, said knives on one shaft being in offset, overlapping relation with the knives on the other shaft, and a handle attached to the end plates of each assembly for separately inserting and removing each assembly from the housing.

2. A meat tenderizing machine comprising a housing having opposing end walls and an open top, brackets carried by the inside of each of the end walls, each bracket having a vertical slot and bearing supports on opposite sides of the slot, a pair of knife assemblies removably mounted in side by side relation in the housing, each assembly including spaced apart end plates, means associated with said plates connecting said plates rigidly together, a shaft rotatably journalled in the plates of each assembly and having its ends extending beyond the plates, bearings on the ends of the shafts, said bearings being seated on the bearing supports, means on the plates disposed in the slots, a plurality of circular knives mounted on each shaft, said knives on one shaft being in offset, overlapping relation with the knives on the other shaft, and a handle attached to the end plates of each assembly for separately inserting and removing each assembly from the housing, said handles being hingedly attached to the end plates for movement from lowered horizontally disposed positions to raised positions in lifting and lowering their assemblies.

3. A meat tenderizing machine comprising a housing having opposing end walls and an open top, brackets carried by the inside of each end wall, each bracket having spaced apart bearing supports and a mounting means vertically disposed between the bearing supports, a pair of knife assemblies removably mounted in side by side relation in the housing, each assembly including end plates, said end plates having means removably engaged in the mounting means of the brackets, a shaft rotatably journalled in the end plates of each assembly and having its ends extending beyond said plates, bearings on the extending ends of each shaft seated on said bearing supports, circular knives mounted on the shafts, with the knives on one shaft disposed in offset overlapping relation with the knives on the other shaft, and a bail like handle hingedly connected at its ends to the end plates of each assembly for separately inserting and removing each assembly through the open top of the housing.

4. A meat tenderizing machine comprising a housing having opposing end walls and an open top, brackets carried by the inside of each end wall, each bracket having spaced apart bearing supports and a mounting means vertically disposed between the bearing supports a pair of knife assemblies removably mounted in side by side relation in the housing, each assembly including end plates, said end plates having means removably engaged in the mounting means of the brackets, a shaft rotatably journalled in the end plates of each assembly and having its ends extending beyond said plates, bearings on the extending ends of each shaft seated on said bearing supports, circular knives mounted on the shafts, with the knives on one shaft disposed in offset overlapping relation with the knives on the other shaft, and a bail like handle hingedly connected at its ends to the end plates of each assembly for separately inserting and removing each assembly through the open top of the housing, and a lid hinged to said housing and enclosing the open top, said lid having a feed opening therein and the handles being adapted to lie horizontally on the outside of each assembly when the lid is closed.

5. A meat tenderizing machine comprising a housing having opposing end walls and an open top, brackets carried by the inside of each end wall, each bracket having spaced apart bearing supports and a mounting means interposed between said supports, a pair of knife assemblies removably mounted in side by side relation in the housing for the passing of meat therebetween, each knife assembly including spaced apart end plates, rods connecting said end plates, a shaft rotatably journalled between the plates of each assembly and having its ends extending beyond said plates, bearings on said ends seated in said bearing supports, means carried by the end plates disposed in said mounting means, a plurality of circular knives mounted on each of the shafts with the knives on one shaft disposed in offset overlapping relation with the knives on the other shaft, and handles hingedly attached to the end plates of each assembly and adapted to lie horizontally on the end plates on the outside of each assembly and to be moved to vertical positions above each assembly to lift each assembly separately from the housing.

6. A meat tenderizing machine comprising a housing having opposing end walls and an open top, brackets carried by the inside of each end wall, each bracket having spaced apart bearing supports and a mounting means interposed between said supports, a pair of knife assemblies removably mounted in side by side relation in the housing for the passage of meat therebetween, each knife assembly including spaced apart end plates, rods connecting said end plates, a shaft rotatably journalled between the plates of each assembly and having its ends extending beyond said plates, bearings on said ends seated in said bearing supports, means carried by the end plates disposed in said mounting means, a plurality of circular knives mounted on each of the shafts with the knives on one shaft disposed in offset overlapping relation with the knives on the other shaft, and handles hingedly attached to the end plates of each assembly and adapted to lie horizontally on the end plates on the outside of each assembly and to be moved to vertical positions above each assembly to lift each assembly separately from the housing, stripper units carried by each assembly and including a plurality of parallel spaced apart bars interposed between the knives at the adjoining sides of the assemblies and mounting means carried by each stripper unit releasably attached to the rods connecting the end plates.

7. A meat tenderizing machine as claimed in claim 6, wherein said mounting means for the stripper units includes clips hooked on said rods.

8. A meat tenderizing machine as claimed in claim 5, wherein a lid is hingedly mounted on the housing to enclose the open top, said lid having a feed opening communicating with the space between each assembly so that meat is fed between the knives of each assembly and means operatively associated with the lid for holding said lid in a closed position.

9. A meat tenderizing machine as claimed in claim 8, wherein stripper units are releasably carried by each assembly and each include a frame and a plurality of parallel spaced apart bars vertically interposed between the knives of each assembly at the adjoining sides of each assembly, mounting means carried by the frames removably fitted on the bars connecting the end plates of each assembly.

10. A meat tenderizing machine as claimed in claim 9, wherein said frames of the stripper units have extensions which mate to form a delivery chute above the knives and communicating with the feed opening in the lids.

References Cited in the file of this patent

UNITED STATES PATENTS

| | | |
|---|---|---|
| 2,131,397 | Gurney | Sept. 27, 1938 |
| 2,472,800 | Ahrndt | June 14, 1949 |
| 2,513,025 | Jackson | June 27, 1950 |
| 2,561,867 | Jackson | July 24, 1951 |
| 2,605,497 | Spang | Aug. 5, 1952 |
| 2,607,951 | Moree | Aug. 26, 1952 |
| 2,622,269 | Berglund et al. | Dec. 23, 1952 |